Patented Jan. 11, 1927.

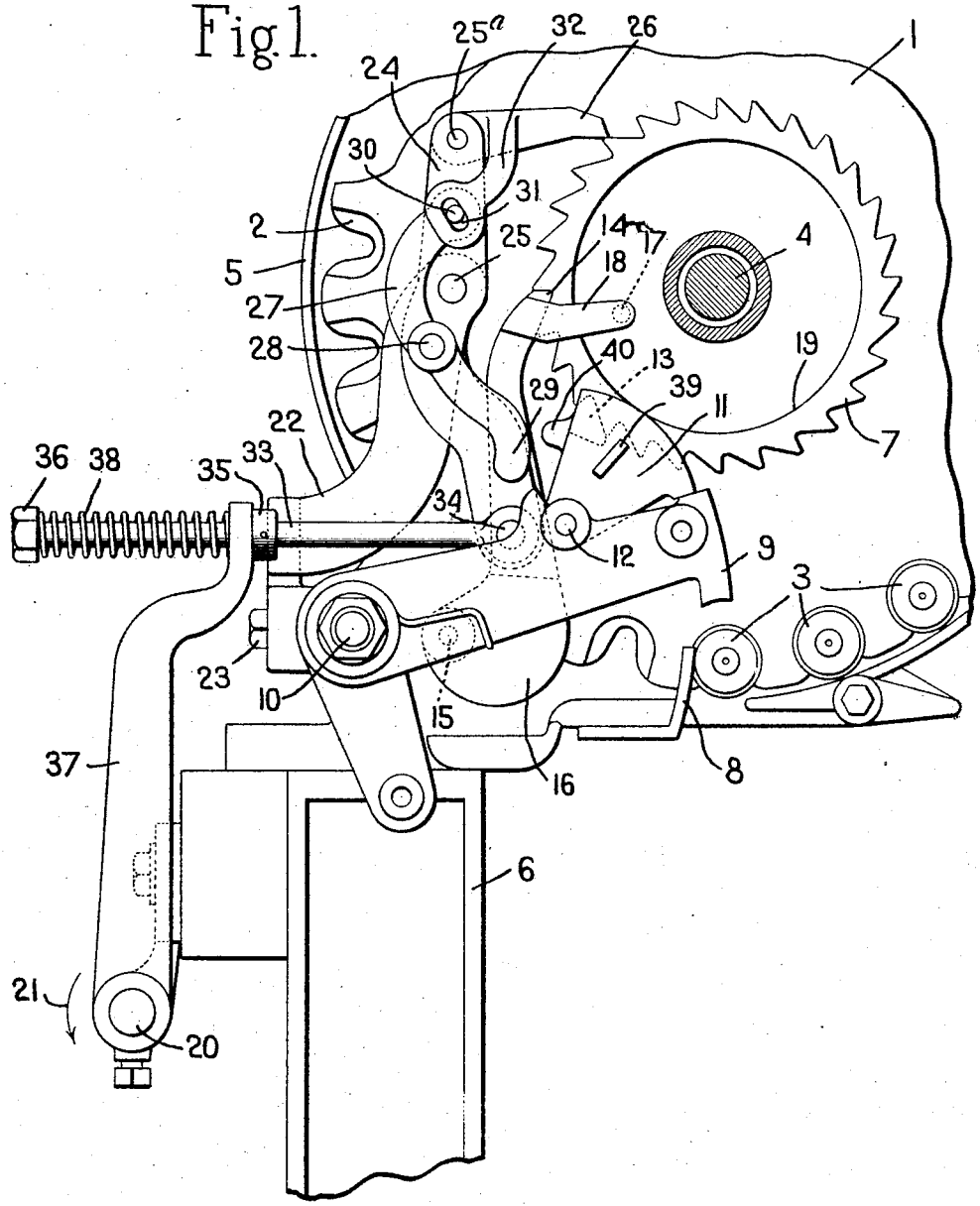

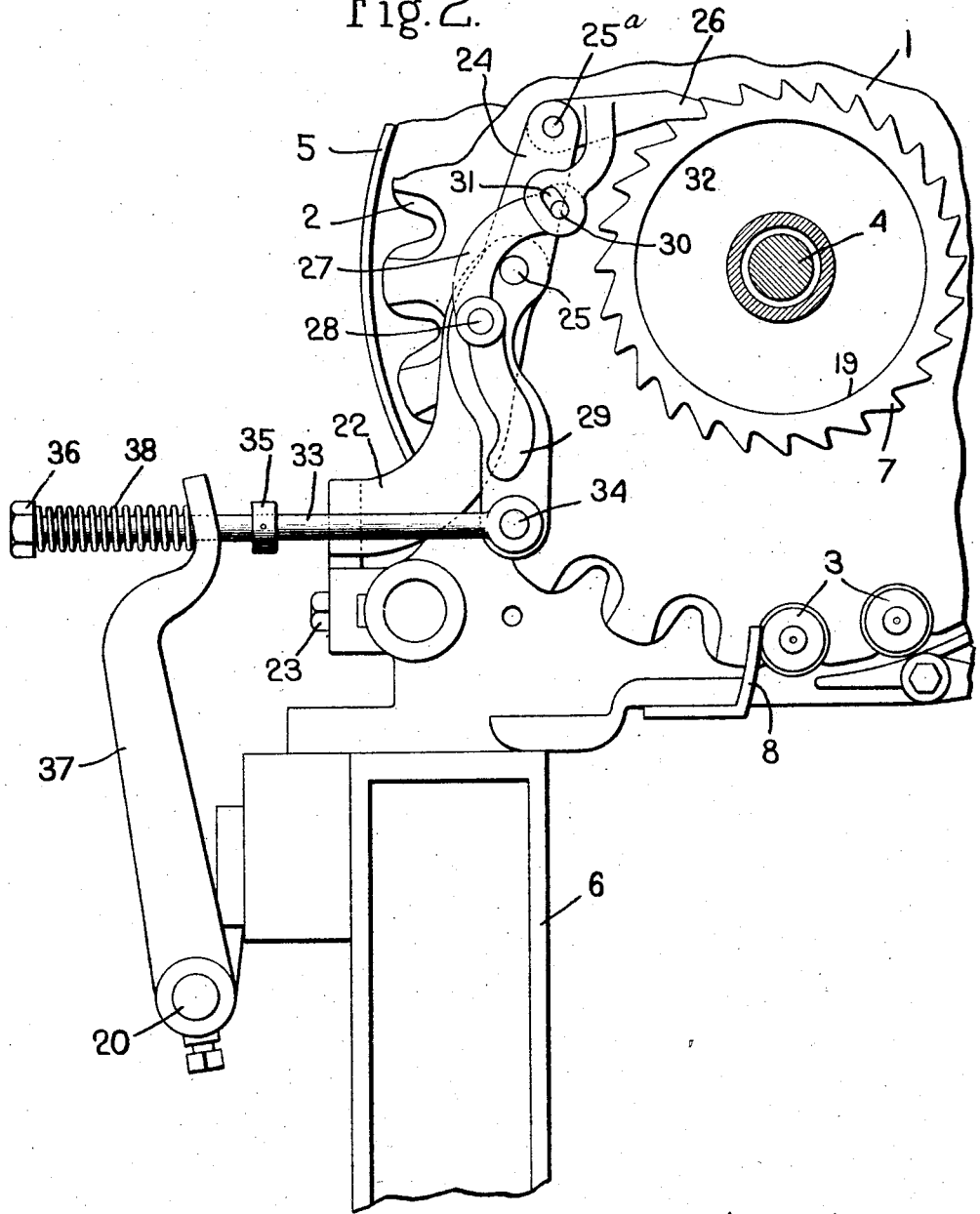

1,614,209

UNITED STATES PATENT OFFICE.

ALONZO E. RHOADES, OF HOPEDALE, MASSACHUSETTS, ASSIGNOR TO DRAPER CORPORATION, OF HOPEDALE, MASSACHUSETTS, A CORPORATION OF MAINE.

BATTERY FEED FOR LOOMS.

Application filed October 13, 1925. Serial No. 62,223.

This invention relates to automatic filling replenishing looms in which a supply of filling carries, such as bobbins, is maintained in a battery, hopper or feeder, and in which these filling carriers, when the supply of running filling is to be replenished, are successively transferred from the feeder to the lay through the operation of automatic mechanism. A well-known type of mechanism to which this invention relates is shown in the patent to Stimpson No. 664,790, granted December 25, 1900, wherein a rotatable filling feeder is rotated through the agency of a cooperating ratchet wheel and feed pawl, the feed pawl being actuated by some moving part of the mechanism, such as the transferrer device, which transfers the filling carriers from the feeder.

It is of great importance in the operation of such mechanisms that the filling carrier presented by the feeder in position for transfer shall be accurately positioned and maintained with certainty in this transfer position at the time transfer takes place. Otherwise the transferring mechanism may fail to operate properly and injury be done either to the cloth being woven, to the mechanism of the loom, or to both.

The principal object of the present invention is to provide a mechanism, called into action upon the initiation of filling replenishment which shall act yieldingly to advance the filling feeder to hold the filling carrier therein which is ready for transfer accurately and surely in the transfer position.

Replenishing mechanisms of the type here involved usually to include an abutment against which the filling carriers in the rotary filling feeder are successively brought by the rotation of the feeder. Consequently a filling carrier ready for transfer, if held up close against this abutment, will be accurately positioned for transfer.

A further object of the present invention is, therefore, to provide means, called into action upon initiation of filling replenishment, which shall yieldingly advance the filling feeder so as yieldingly to hold the filling carrier which is ready for transfer up against this abutment and consequently hold it accurately and surely in transfer position.

The present invention comprises, in addition to the usual feed pawl and the usual detent pawl, when employed, a positioning pawl by means of which the rotatable filling feeder is yieldingly advanced to position the filling carrier therein which is ready for transfer. It is frequently desirable to be able to rotate the filling feeder freely by hand in either direction, especially when introducing a supply of fresh filling carriers.

A further object of the invention is, therefore, to provide means whereby, when a movement is given to the feed pawl to throw it out of cooperation with the ratchet wheel, the detent pawl, if used, and the positioning pawl are simultaneously thrown out of cooperation with the ratchet wheel, thus enabling the filling feeder to be rotated freely in either direction.

These and other objects and features of the invention will appear more fully from the accompanying description and drawings and will be particularly pointed out in the claims.

The drawings illustrate so much of an automatic filling replenishing loom of the Northrop type, and such as shown in a general way in the aforesaid patent to Stimpson, as is necessary to a disclosure of the present invention In the drawings:

Fig. 1 is an end elevation partially in transverse section of a sufficient portion of the loom necessary to the disclosure of the present invention with a preferred form thereof embodied therein.

Fig. 2 is a view similar to Fig. 1 with some of the parts removed and with the positioning pawl and its operating connections shown in active position.

The general construction and operation of this type of loom being well-known and familar to those skilled in the art, it is only necessary to illustrate and describe the features particularly concerned with the present invention.

The rotary battery, hopper or feeder comprises two parallel disks 1, of which only one is shown, provided with a circular series of seats 2 for the butts of the filling carriers 3, herein shown as bobbins. The feeder is rotatably mounted on the stud 4 secured in the stand 5, which is supported from the loom frame 6. The hopper or feeder has formed thereon, or rigidly secured thereto, the concentric ratchet wheel 7, the teeth of which correspond in number with the seats 2 so that as the ratchet wheel is moved one tooth, a filling carrier 3 is brought into position for transfer or up against the guiding abutment 8.

The usual transferrer arm 9 is pivotally mounted at 10 upon the stand 5. Upon the initiation of filling replenishment, this transferrer arm, through mechanism not illustrated, is swung downwardly engaging the filling carrier 3, located beneath it in position for transfer, and transfers the filling carrier from its position in the feeder to the lay. When the filling carrier is a bobbin as shown, it is transferred directly into the shuttle, which is then held by the lay directly beneath.

The rotation of the filling feeder to present a fresh filling carrier in position for transfer, or against the abutment 8, is usually secured by a feed pawl, shown as a sector shaped device 11 pivoted at 12 on the transferrer arm 9. The tooth 13 of this feed pawl is a projection properly shaped to cooperate with the teeth of the ratchet wheel 7. In the usual operation of this mechanism when the transferrer arm 9 swings downward to effect transfer, the pawl 11 swings about the pivot 12 and the tooth 13 slips down into engagement with the next tooth of the ratchet wheel 7, so that when the transferrer arm swings back to normal position after transfer, the ratchet wheel 7 will be rotated one tooth by the feed pawl.

Retrograde movement of the feeder is usually prevented by a detent pawl 14 pivoted at 15 to the stand 5 and movable by gravity, due to its weighted foot 16, to engage the teeth of the ratchet wheel 7. A lateral lug 17 carried by an extension 18 comes into engagement with the inner periphery 19 of the ratchet wheel 7 to prevent accidental disengagement of the detent pawl from the ratchet wheel.

The mechanism for initiating the filling replenishing operations in the Northrop type of loom illustrated usually comprises a starter rod 20 journalled at the front of the loom. This rod is given a rocking movement in the direction of the arrow 21 when replenishment is called for. In the preferred form of this invention, this starter rod is utilized as the actuating element of the construction with which the present invention is particularly concerned.

A suitable supporting bracket 22 is rigidly bolted at 23 to the transferrer stud or some fixed part of the loom and extends upward adjacent the ratchet wheel 7. A pawl carrier 24 in the form of a lever is pivoted or fulcrumed at 25 to the upper end of the bracket 22. This pawl carrier 24 has pivoted thereto at its upper end 25ª the positioning pawl 26 which cooperates with the teeth of the ratchet wheel 7. The positioning pawl is supported in position to cooperate with the ratchet wheel by a construction which is also conveniently utilized to swing the positioning pawl out of engagement with the ratchet wheel when required. For this purpose a lever 27 is shown fulcrumed at 28 on the pawl carrier 24. This lever has a depending tail 29 and at its upper end carries a stud 30 riding in a slot 31 at the lower end of an arm 32 rigid with and extending downwardly from the positioning pawl 26. The slot 31 in the arm 32 is oblique to the arc in which the slot travels about the pivot 25ª so that there is a cam action between the walls of this slot and the stud 30. If the lever 27 be rocked clockwise on its fulcrum 28, the positioning pawl 26 is elevated.

A link, shown as a rod 33, extending in a generally horizontal forward direction is pivoted at its rear end at 34 to the lower end of the pawl carrier 24. This link is provided with a collar 35 secured thereto, and at its free end with a nut 36 threaded thereon. An actuator arm 37 is rigidly secured to the starter rod 20, extends upwardly therefrom, and straddles the link or rod 33 in front of the collar 35. A helical compression spring 38 is mounted on the link 33 and extends between the nut 36 and the end of the arm 37. There is thus formed a yielding connection between the actuating element such as the arm 37 and the positioning pawl 26 which acts upon the movement of the actuator, when moved by or through initiation of filling replenishment, to move the positioning pawl yieldingly to engage the teeth of the ratchet wheel 7 and advance the ratchet wheel yieldingly so as to hold the filling carrier 3, which is ready for transfer, up against the abutment 8 or in position for transfer. The actual movement of advance of the filling feeder may be very slight, but the important thing is that the positioning pawl 26 is yieldingly advanced so as yieldingly to hold the filling carrier up against the abutment 8 or in transfer position and that this movement takes place upon initiation of filling replenishment, so that the exact and proper position of the filling carrier in the feeder ready for transfer is assured with certainty at the time transfer takes place. The arm 37 is swung to the left, as shown in Fig. 2, upon initiation of filling replenishment and the movement of the pawl carrier 24 and positioning pawl 26 is exerted entirely through the spring 38. When the starter rod swings back to normal position, shown in Fig. 1, the arm 37 engaging the collar 35 restores the pawl carrier and positioning pawl to normal position.

In order to provide for the manual or free rotation of the filling feeder in either direction whenever desired, as when filling the feeder with a supply of fresh filling carriers, it is necessary that all the pawls cooperating with the ratchet wheel 7 shall be thrown out of cooperative relation with respect thereto. For this purpose the feed pawl 11 is provided with a projection or handle 39 and with a striker arm 40, shaped so as to engage the rear edges of the shank of the detent pawl 14 and the tail 29 of the lever 27. Consequently when the operative seizes the handle 39 and rocks the feed pawl 11 to the left about its pivot 12, the feed pawl tooth 13 will be freed from the ratchet wheel and the striker arm 40 will pick up the detent pawl 14 and force it out of engagement with the ratchet wheel and will at the same time pick up the tail 29 of the lever 27, rocking this lever and causing it, through the cam connection formed by the stud 30 and slot 31, to raise the positioning pawl 26 out of cooperation with the ratchet wheel. Thus, by one movement of the handle 39, all three pawls are thrown out of cooperative relation to the ratchet wheel, leaving the feeder free to be rotated in either direction.

Having thus described the invention, what is claimed as new, and desired to be secured by Letters Patent, is:

1. In an automatic filling replenishing loom a rotatable filling feeder to hold a series of filling carriers, a ratchet wheel rotatable therewith, an abutment against which the said filling carriers are successively brought by the rotation of the feeder prior to transfer therefrom, a positioning pawl cooperating with the ratchet wheel, an actuator moved by or through initiation of filling replenishment, and a yielding connection between said actuator and pawl acting, upon the movement of the actuator, to cause the pawl yieldingly to advance the ratchet wheel to hold the filling carrier, ready for transfer, against said abutment.

2. In an automatic filling replenishing loom a rotatable filling feeder to hold a series of filling carriers, a ratchet wheel rotatable therewith, a bracket, a pawl carrier movably mounted on the bracket, a positioning pawl pivoted on the pawl carrier and cooperating with the ratchet wheel, a starter rod rocked by or through initiation of filling replenishment, an arm secured to the starter rod and a yielding connection between the arm and the pawl carrier acting, upon rocking of the starter rod, to move the pawl carrier and cause the pawl yieldingly to advance the ratchet wheel to hold the filling carrier, ready for transfer, in transfer position.

3. In an automatic filling replenishing loom a rotatable filling feeder to hold a series of filling carriers, a ratchet wheel rotatable therewith, a positioning pawl cooperating with the ratchet wheel, an actuator moved by or through initiation of filling replenishment, and a yielding connection between said actuator and pawl acting, upon the movement of the actuator, to cause the pawl yieldingly to advance the ratchet wheel to hold the filling carrier, ready for transfer, in transfer position.

4. In an automatic filling replenishing loom a rotatable filling feeder to hold a series of filling carriers, a ratchet wheel rotatable therewith, a pawl carrier movably mounted adjacent the ratchet wheel, a positioning pawl pivoted on the pawl-carrier and cooperating with the ratchet wheel, a starter rod rocked by or through initiation of filling replenishment, an arm secured to the starter rod, and a yielding connection between the arm and the pawl carrier acting, upon rocking of the starter rod, to move the pawl carrier and cause the pawl yieldingly to advance the ratchet wheel to hold the filling carrier, ready for transfer, in transfer position.

5. In an automatic filling replenishing loom the construction defined in claim 4, in which the said yielding connection comprises a link pivoted to the pawl carrier, a spring mounted on the link, a collar on the link, and in which the said arm straddles the link between the spring and the collar.

6. In an automatic filling replenishing loom a rotatable filling feeder to hold a series of filling carriers, a ratchet wheel rotatable therewith, a feed pawl cooperating with said ratchet wheel and means for actuating it to effect rotation of the feeder to bring the filling carriers successively into position for transfer, a positioning pawl cooperating with the ratchet wheel, and means for yieldingly actuating the positioning pawl upon initiation of filling replenishment to cause it yieldingly to advance the ratchet wheel to hold the filling carrier, ready for transfer, in transfer position.

7. In an automatic filling replenishing loom the construction defined in claim 6, together with means acting, upon the movement of the feed pawl to throw it out of cooperation with the ratchet wheel, simultaneously to throw the positioning pawl out of cooperation with the ratchet wheel and thereby permit the ratchet wheel to be rotated freely in either direction.

8. In an automatic filling replenishing loom a rotatable filling feeder to hold a series of filling carriers, a ratchet wheel rotatable therewith, a feed pawl cooperating with said ratchet wheel and means for actuating it to effect rotation of the feeder to bring the filling carriers successively into position for transfer, a detent pawl cooperating with the ratchet wheel to prevent reverse rotation of the feeder, a positioning pawl cooperating with the ratchet wheel, means for yieldingly actuating the positioning pawl upon initiation of filling replenishment to cause it yieldingly to advance the ratchet wheel to hold the filling carrier, ready for transfer, in transfer position, and means acting, upon movement of the feed pawl to throw it out of cooperation with the ratchet wheel, simultaneously to throw the positioning and detent pawls out of cooperation with the ratchet wheel and thereby permit the ratchet wheel to be freely rotated in either direction.

In testimony whereof, I have signed my name to this specification.

ALONZO E. RHOADES.